UNITED STATES PATENT OFFICE.

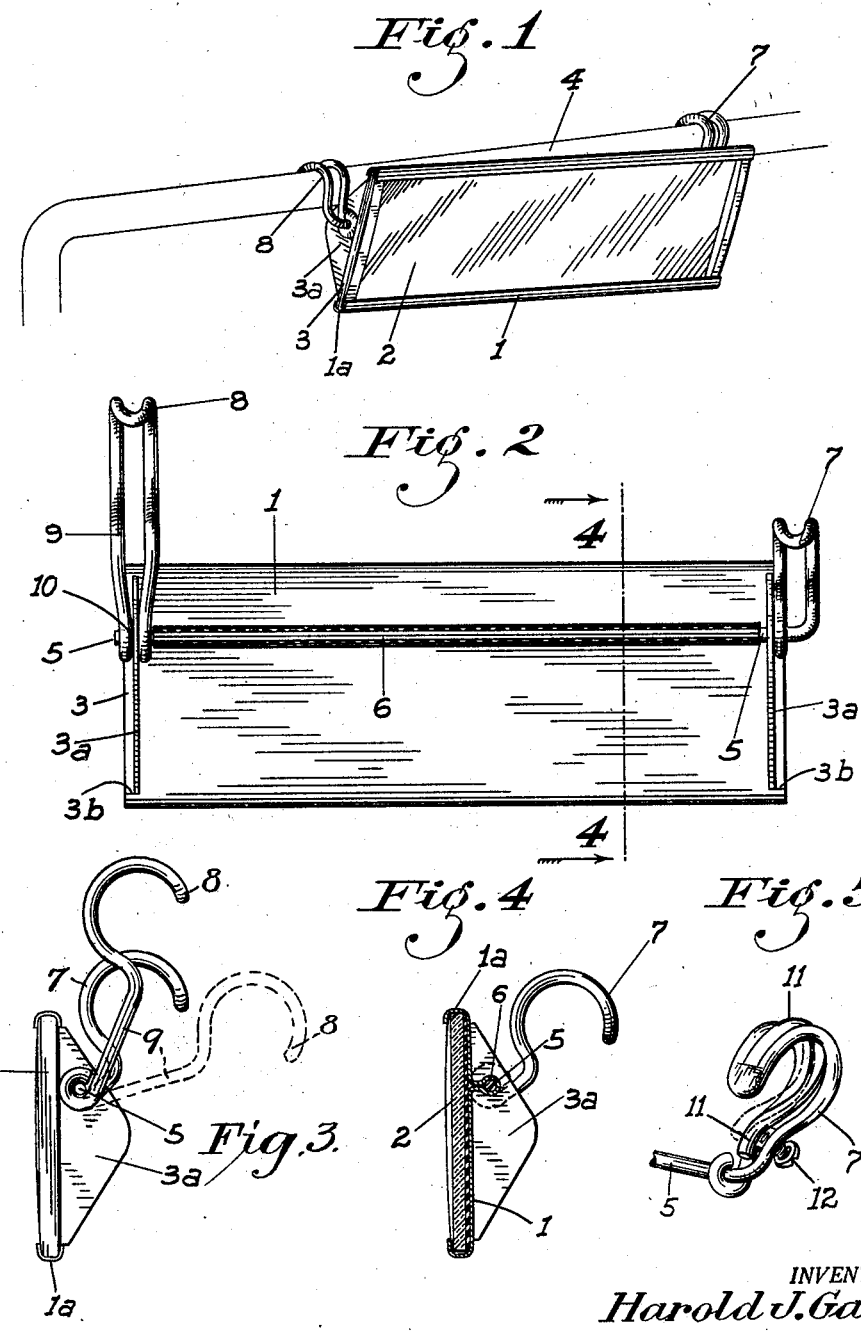

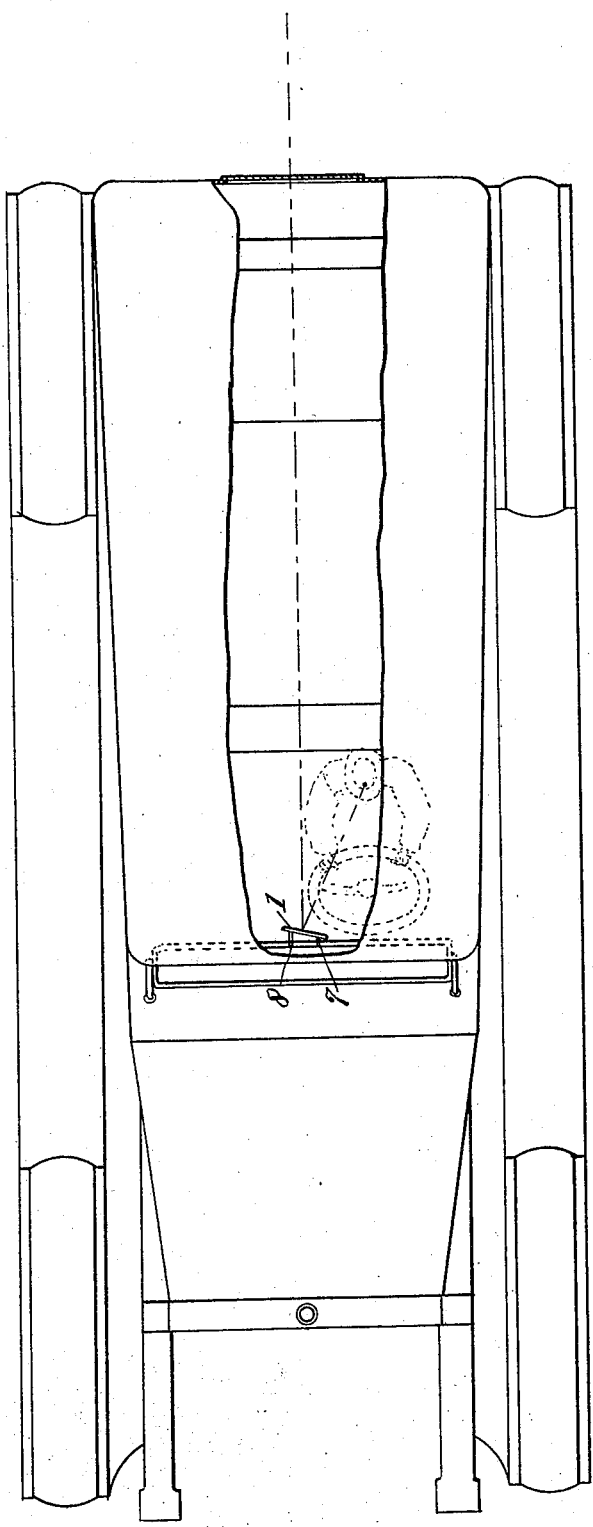

HAROLD J. GAGE, OF STOCKTON, CALIFORNIA.

ADJUSTABLE VIEW-REFLECTOR.

1,387,887.  Specification of Letters Patent.  Patented Aug. 16, 1921.

Application filed January 9, 1919. Serial No. 270,390.

*To all whom it may concern:*

Be it known that I, HAROLD J. GAGE, a citizen of the United States of America, residing at Stockton, in the county of San Joaquin, State of California, have invented certain new and useful Improvements in Adjustable View-Reflectors; and I do declare the following to be a clear, full, and exact description of the same, reference being had to the accompanying drawings, and to the characters of reference marked thereon, which form a part of this application.

This invention relates to improvements in adjustable view reflectors, being particularly adapted and designed for use on automobiles to permit of the driver of the car being able to see what is coming behind him.

The principal object of the invention has been to construct a reflector of this type which is adapted to be hung on the windshield of the car, and which may be easily adjusted to different angles of reflection.

A further object has been to provide such a reflector, which, by a simple and quickly performed rearrangement of certain removable parts, may be positioned on the windshield to accommodate the line of vision of drivers whose eyes, on account of difference in length of their torso, are lower or higher than one another as the case may be.

A still further object of the invention is to produce a simple and inexpensive device and yet one which will be exceedingly effective for the purposes for which it is designed.

These objects, I acccomplish by means of such structure and relative arrangement of the parts as will fully appear by a perusal of the following specification and claims.

On the drawings, similar characters of reference indicate corresponding parts in the several views:

Figure 1 is a perspective view showing the reflector as positioned on an automobile windshield.

Fig. 2 is a rear elevation thereof.

Fig. 3 is an end elevation.

Fig. 4 is a cross section taken on a line 4—4 of Fig. 2, depicting the other end of the reflector from that shown in Fig. 3.

Fig. 5 is a detached view of a modified form of hanger-hook.

Fig. 6 is a view in plan, showing the application of the present invention to a motor vehicle and the manner in which the line of vision is accommodated.

Referring now more particularly to the figures of reference on the drawings, the numeral 1 indicates the frame of the reflector, preferably of sheet metal and of rectangular shape, this frame being open at the ends, and the side edges being bent toward each other as at 1ª to form grooves at the top and bottom, which grooves are adapted to hold a mirror 2, slightly shorter than the frame, which is positioned in the frame by being slid along the grooves from the open ends.

These open ends are then closed by end pieces 3 wedged in the overhanging ends of the grooves. From the back of each of these end pieces projects an ear 3ª, the back of the frame being cut away slightly at the ends, as at 3ᵇ, to accommodate these ears, which are adapted to rest against the windshield 4.

A horizontal rod 5 projects through orifices provided in the ears and is mounted on a sleeve 6 formed integral with the frame 1, and offset about a half an inch from the horizontal center line thereof.

This sleeve grips the rod and prevents it from turning too easily, but has no fastenings or catches to prevent the rod being withdrawn therefrom when desired.

At one end, the rod 5 beyond the ear 3 is bent away from the frame to form a hook 7 of a shape and size adapting it to be hung over the metal frame of the windshield 4. At the other end, the rod projects a certain distance beyond the ear 3 at that end, and there terminates. Rotatably mounted upon the terminating end of the rod 5 is another hook, as indicated at 8. The hook portion of this member is substantially identical with the hook 7 although the shank is considerably longer, thus disposing the rod 5 and the frame carried thereby at an angle in a horizontal plane to the fixture upon which the two hooks are fastened. The hook 8 is formed of a double piece of wire 9, having eyes through which the rod 5 extends. As particularly shown in Fig. 2 it will be seen that the two lengths of the wire at the point where the eyes are formed converge and bind against the frame ear 3ª, as indicated at 10. Thus, due to the resiliency of the wire 9, the hook will be frictionally held in relation to the ear and may be set in any desired manner and will remain in its set position, at the same time making it possible to be readily adjusted for other angles.

The bend of the hook 8, however, is considerably farther away from the frame 1 than is the hook 7.

Referring to Figs. 2 and 3, it will be noted that if the reflector is hung on a windshield frame with the hooks positioned as shown in the figures, that is, with the bend of the hooks in vertical alinement, the reflector will have horizontal angularity relative to the horizontal frame of the windshield. If, however, the longer hook 8 is turned on the rod 5 to the dotted position shown in Fig. 3, the edge of the reflector will lie horizontally parallel to the windshield but will be angled relative to the transverse plane thereof, any intermediate position of the hook 8 determining the relative ratios of the angles. Angularity of the reflector relative to the vertical plane of the windshield may be had at any time by turning the reflector about the rod 5 while maintaining the hooks in their relative positions.

Thus, it will be seen that this construction permits of an unlimited variation of the angles of adjustment of the reflector relative to the windshield.

Also, it will be noted that by removing the rod 5 from the sleeve, and reinserting it in a reverse manner in the other end, and of course the hook 8 likewise, the position of the reflector relative to its height from the top of the windshield will be altered a distance equal to double the spacing of the sleeve 6 from the center line of the reflector. In the drawing, it is shown in the lowest position.

If desired, the hooks 7 and 8 may be adapted to clamp onto frames of varying sizes by having a stiff spring 11 secured at its outer end to the hooks between the wires thereof, the lower end being free but the outer surface at such end being in contact with an adjusting screw 12 mounted to the hooks and projecting between the two wires thereof.

Thus, it will be seen that by turning upon the screw the free end of the wire 11 will be forced inwardly to grip the bar on which the hook is hung.

From the foregoing description, it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. An adjustable view reflector for motor vehicles comprising a frame, a mirror mounted therein, a longitudinal rod turnably mounted on the frame at the back thereof and offset from the center line, clamping means mounted on the rod at both ends thereof and adapted to hold the reflector on the windshield of the vehicle, and means whereby the angular position both horizontally and transversely relative to the windshield may be adjusted at will.

2. An adjustable view reflector adapted to be mounted on the windshield of an automobile comprising a rectangular frame, a mirror mounted therein, a longitudinal rod turnably mounted on the frame at the back thereof and offset from the center line, a hook formed integral with the rod at one end and extending away from the frame, and a second hook turnably mounted on the rod at the other end thereof, the arm of the last named hook being longer than that of the other hook.

3. An adjustable view reflector comprising a frame, a mirror carried thereby, a longitudinal pivot secured to the back of said frame and around which the frame may be vertically adjusted, a hook secured at one end of said pivotal axis, a hook having a longer arm secured at the opposite end of said longitudinal axis, and free to move in relation to the first-named hook, and friction engaging means whereby the angular relation of the two hooks may be adjustably maintained.

4. An adjustable reflector for vehicles comprising a reflecting unit, a longitudinally extending member to which said unit is pivoted, supporting members carried at the opposite ends of the said longitudinal member, and means whereby changes in the angular relation of the supporting members to each other will swing the reflector horizontally without affecting its pivotal movement.

5. A reflector for vehicles comprising a reflecting unit, a longitudinally extending member to which the unit is pivoted, supporting clips carried at the opposite ends of said longitudinal member and adapted to move independently of each other, and means whereby a change in relative angular relation of the clips will tend to move one end of the reflecting unit horizontally and vertically relative to the opposite end of said unit.

6. A reflector for vehicles comprising a reflecting unit, rearwardly extending ears disposed at the opposite ends of the back of the unit, supporting clips of different lengths one pivotally mounted to each of said ears whereby a change in the relative angular positions of the clips will cause one end of the reflector to swing vertically and horizontally in relation to the opposite end, at the same time permitting the reflector to pivot around the longitudinal axis of the two clips.

In testimony whereof I affix my signature in presence of a witness.

HAROLD J. GAGE.

Witness:
 VERADINE WARNER.